US006490106B1

United States Patent
Wetzel (10) Patent No.: US 6,490,106 B1
(45) Date of Patent: Dec. 3, 2002

(54) RADIATION AMASSMENT DEVICE DERIVED THROUGH CYCLICAL ACCRETION OF LIGHT

(76) Inventor: Douglas A. Wetzel, 5 N. Lancaster St., Mount Prospect, IL (US) 60056

( * ) Notice: Subject to any disclaimer, the term of this patent is extended or adjusted under 35 U.S.C. 154(b) by 0 days.

(21) Appl. No.: 09/609,951

(22) Filed: Jul. 3, 2000

(51) Int. Cl.[7] .................................................. G02B 5/04
(52) U.S. Cl. ........................ 359/831; 359/833; 359/834
(58) Field of Search ........................... 372/100; 359/638, 359/831, 833, 834, 836, 431, 850, 855; 126/685

(56) References Cited

U.S. PATENT DOCUMENTS 3,453,425 A * 7/1969 Whitaker ..................... 359/859
4,744,090 A * 5/1988 Freiberg ....................... 372/95

* cited by examiner

*Primary Examiner*—Mohammad Sikder
(74) *Attorney, Agent, or Firm*—Sidney N. Fox (57) ABSTRACT

There is disclosed an optical system for light beam amassment and concentration derived through intensification by cyclical accretion of light energy by passing a parallel light beam perpendicular to a 100% reflection double-faced conical optical glass prism repetitively cyclically via plural 100% reflective single-faced right-angle isosceles optical prisms arranged in a path surrounding said compound optical glass prism defining an endless recycled return path to and through said compound optical glass prism, the amassment occurring during the passage of said light beam through said compound conical prism to be reflected from the conical prism as an emergent amassed and concentrated light beam occasioned by each repeated pass to and from said conical portion of said compound prism and to and through a beam-splitting quadrivial prism to said return path to said compound prism and the conical prism portion thereof and emergence therefrom, an single-faced right-angle isosceles prism arranged to intercept said emergent light beam for discharge of the light energy therefrom. Single, double and unitary compound optical prisms are disclosed.

8 Claims, 4 Drawing Sheets

RADIATION AMASSMENT DEVICE DERIVED THROUGH CYCLICAL ACCRETION OF LIGHT

FIELD OF THE INVENTION

This invention relates generally to radiation concentration methods and means, and more particularly provides an optical method for radiation amassment derived through intrinsic concentrated cyclical accretion of light by passing a parallel beam thereof to a compound double-faced conical optical prism cyclically via plural single faced 100% reflective right-triangular optical prisms in an arrangement defining an endless return path to and through said compound double-faced conical optical prism whereby to produce a controlled single intensified output beam of modified either or both of reduced width and/or length.

BACKGROUND OF THE INVENTION

Concentration of reflected radiation energy, particularly light energy, has encountered many problems in with efficiency, complexity and expense in systems employed in the past.

Prior art believed pertinent to the state of the art relating to the field of the invention include:

| Patentee | Number | Date |
| --- | --- | --- |
| Downs | 4,858,090 | August 15, 1989 |
| Julin | 1,535,314 | April 18, 1925 |
| Sauer | 2,168,273 | August 1, 1939 |
| Chenausky et al | 3,950,712 | April 13, 1976 |
| Dorschner | 4,818,087 | April 4, 1989 |
| Pullen | 5,016,995 | May 21, 1991 |
| McKeown et al. | 5,078,473 | January 7, 1992 |

Downs discloses an ellipsoidal reflector/concentrator for light energy in which light from a source enters an ellipsoidal housing in which the ellipse is rotated about a line passed perpendicularly through the ellipse major axis at the second focus (2) with the first focus (1), now a distributed focus (1), in the form of a circle while the other focus (2) remains a point focus with the laws of elliptical reflection remaining in effect. This was said to work well with ultrasonic and explosive energy that may be placed along a distributed focus (1). Such energy, leaving generally perpendicular to the second focus (2), will strike the surface of the ellipsoid in the proper attitude to be reflected to the second focus (2).

However, each point along the generator of such energy radiates its energy in all directions so as to introduce a large axial error for much of its energy when trying to use a filament or gas-discharge tube, for a source of light. Even if it were possible to concentrate all of the light energy from such a source of light, the temperature of an image of incoherent light is a laser, the temperature may reach high enough to bring about atomic fusion, according to Downs.

An ellipsoidal reflection system may be provided with the ellipsoidal reflector by passing the axis of rotation through one focus but missing the other with a distributed focus at one end and a point focus at the other end. Such an ellipsoidal reflective system will be conical as it approached the second focus. With multiple reflectors within an ellipse, a phenomenon results when a ray of energy passes through a focus, it will reflect from the inner surface of the ellipse and pass through the other focus. The internal reflective process will, theoretically, go on after each reflection, the ray path will be more nearly aligned with the major axis. A problem with multiple ellipsoidal reflection systems is that a source of energy located at one focus will be in the path of energy after the second reflection. If multiple ellipsoidal reflections are to be utilized, there must not be substance at either focus. The solution offered to this problem was to position the energy source to the side from the ellipsoidal axis running through both focus points with energy from the energy source injected to converge at one focus so that with no physical obstructions at this focus nor at the other focus multiple reflections may occur. According to Downs, many methods of energy ray concentration are feasible with the only requirement being that energy must converge on one focus.

Downs provided an ellipsoidal system wherein an energy source generates energy radiation focussed through a lens to an ellipsoidal point focus (focus 1) it is thereby confocal with the main ellipsoidal point focus (focus 1). Per Downs, the main ellipsoid was comprised of two ellipsoid reflective sections adjacent two point focus (focus 2) with both curved to match a portion of the common ellipsoid. Both sections are curved to match portions of a common ellipsoid. The internally reflected ellipsoid section is shown to encompass an end of the shape of the ellipsoid and has a small opening to permit passage of a narrow beam of energy outward from the ellipsoidal system, and also, opposite end reflective section that reflects energy beams back through point focus (focus 1) to pass through the small end opening. A cut out was provided in the ellipsoid reflective section to permit passage of focussed energy beams passed through the lens to pass to and through the point focus 1.

One way reflector systems that reflect on the inside and pass radiated energy on through from the outside to the inside could be used in place of the aforementioned cutouts, and with it then possible to have energy directing devices directly opposite of each other rather than having to be spaced. Thus it would be possible to use an annular rotated secondary ellipsoidal reflector projecting radiated energy into a primary reflector through an entire 360 degree circle via a band of one way reflector material as a part of the primary reflector.

Downs asserts that it is not practical to make too many passes since energy is not passing through a system focus the first time has a tendency to go further afield with each pass. Further, if a ray of energy misses a focus on the first pass, it can never cross either focus no matter how many passes it makes.

Downs also suggests placing reflectors at the end exit reflector of the reflective system, so that energy rays reflected toward the point focus (2) are intercepted in front of the point focus (2) by a hyperboloid reflector and reflected back generally along the system primary axis with much of this reflected energy radiation passing out through the small exit opening in the form of a relatively narrow radiated energy beam. This beam as an output is neither coherent nor monochromatic.

Downs does disclose a reflector/concentrator for light energy where light is repeatedly reflected within an elliptical housing through a narrow opening. However, the reflective arrangement within the ellipsoidal reflector system is complex and depends upon the energy reaching specific focus points.

Sauer provides an optical system comprising a pair of prisms disposed removably or at lease variably spaced in front of a lens. The prisms have angular reflecting surfaces adapted to direct rays of light off the angular surfaces as the rays pass through the prism so as to converge directed to a point on the optical axis of a lens and a plane imagined at the point of intersection of these axes and standing at right angle to the optical axis of the lens in a plane of convergence. The purpose is to provide two pictures in proper stereoscopic relation to each other so that when viewed through suitable optical aids, will fuse into a single picture desired by a stereo optical device. Attention should be given to the angle of incidence of the rays of light upon the reflecting surfaces being angles other than 45 degrees so that the rays diverge to reach the lens.

Pullin provides a radiation focussing device using an annular ring and a central focussing body, the ring having an inwardly facing reflecting surface, the reflecting surface being a part of a surface of a cone with a half-angle of 45 degrees. The circularly focussing body has a peripheral reflecting surface whereupon radiation traveling in radial directions with respect to its axial symmetry (which is the cone axis of the reflecting surface) is directed to a focus and is surrounded by the ring and coaxial with said focus. The shape and effect of the said peripheral is derived from a parabola. The function of the ring is to convert parallel rays into radial rays which impinge upon the peripheral reflecting surface of the focussing body. The ring and the said peripheral surface function as an objective. It appears that the primary usage of the Pullin device is as an optical astronomical telescope for receiving radiant energy.

Julin discloses light dispersing annular prisms which are utilized as plural concentrically arranged groupings for therapeutic application to a human being and allows the light rays to pass through and disperses them into the several kinds of spectral rays suitable for varied therapeutic use. Selected rays are directed to a focus by a selected lens placed in their directed path.

Chenausky et al provide a resonator particularly useful in chemical laser applications, said resonator comprising a ring end mirror, a conical folding mirror and a circular end mirror combined to form an unstable resonator including a radial direction propagation having a gain medium region and a region of axial direction propagation. Chenausky et al provides an output beam which is said to be circular in diameter and has a diameter which is essentially equal to twice the extraction length characteristic of the working medium. The energy extracted by the radial propagating portion of the mode has an approximately uniform distribution in the output beam as a result of the reflective surface area of the conical folding mirror and the spatial variation of the gain of the flow direction of the working medium, the light intensity in the gain region decreases with an increase in the perpendicular distance from the plane at which the gain medium originates.

The maximum power handling capability of the unstable toroidal resonator provided by Chenausky et al is limited for all practical purposes by the power handling capabilities of the circular end mirror. The toroidal mirror has the largest surface area of any of the reflective surfaces and the power handling capability of which is said not to be a limiting factor since the large area experiences the lowest flux density of any of the reflective surfaces exposed to the laser radiation; however, the circular mirror has the incidence flux of highest density and this parameter controls the maximum power from the unstable resonator. The folding mirror experiences a flux density which is higher than that on the circular end mirror and lower than that on the circular end mirror. Problems can arise due to excessive heating in the vicinity of the apex of the folding mirror so that the apex preferably is rounded to avoid a sharp point.

Chenausky et al further discloses that in transferring rays between the radial and axial regions, the conical folding mirror made the radial profile symetrical with respect to both intensity and phase, and optically compensated for spatial gain variation in the flow direction. These functions are accomplished because the higher intensity portions of the radial propagating beam which occur on the upstream side of the beam are distributed along the base of the folding mirror cone, the base of said cone being coplanar with the base of the toroidal end mirror. The lower intensity portions of the radial propagating beam which occur on the downstream ride are distributed along the base of the conical folding mirror where the reflective surface is a minimum. As a result, the intensity profile of the beam is made more uniform in the axial region and in the near field.

The cross-sectional curvature of the toroidal end mirror is circular and has a geometrical axis of symmetry which must be made coincident with the downstream side of the resonant mode in the non-axial region of the resonator (the line passing from the upper portion of the concave reflective surface across the apex of the conical folding mirror). The circular contour collimates the beam from the circular end (toroidal) mirror which is divergent. Alternatively, Chenausky et al proposes that the toroidal mirror contour can be convex and combined with a circular end mirror which is concave or both the toroidal and circular end mirrors made with concave or even non-spherical reflective surfaces such as an off-axis paraboloid.

Dorschner provides an example of an optical storage ring where mirrors are used to produce a non-planar equilateral (skew rhombus) ring path, the mirrors being mounted on a supporting cube having passages cut in the path of a beam of light energy propagating therebetween. The mirrors are positioned on the surface of the cube and produce a non-planar equilateral ring path having path segments in two planes. Mirrors are positioned on the corners of the cube to define the vertices of a tetrahedron circumscribed by the cube. The sensitive axis of such arrangement is along one of the mutually orthogonal principal axes of the cube. The tetrahedral ring is equiangular as well as equilateral; thus all the incidence angles on the mirrors are the same. An orthohedral ring is provided with two mirrors placed on a first of adjacent comers of the cube and two mirrors are placed between the corners of two adjacent corner pairs to provide a path substantially on two of the faces of the cube. Mirrors provide the reflective surfaces of the embodiments disclosed by Dorschner.

McKeown discloses a pyramidal beam splitter for splitting a beam light into several beams at right angles to a reference beam, the beam parallel to the pyramid axis impinging on the apex of the pyramid at right angles to the reference beam, the beam being a laser beam.

The art has long sought means for capturing, concentrating and storing a charge from the input of any parallel radiation source, for example, a light energy source, the charge capable of being discharged in either a rapid or metered manner. Such means would have considerable value in high powered laser usage. Further, metered discharge would be beneficial in industrial applications, medical applications and communications.

Additionally, it would be beneficial to provide an optical system whereby a parallel radiation energy, e.g., light energy, can be rapidly increased in intensity, which can effect rapid amassment of radiation energy by minimum short duration passes through the system with storage of the amassed energy for such selective discharge.

The invention contemplates the use of at least one compound double-faced conical optical prism for receiving a parallel beam consisting of parallel rays of light energy directed from a light energy source to the reflective inner face of the compound double-faced conical optical glass prism, where the light is reflected to the reflective surface to the conical face of an inner centrally concentrically arranged coaxially located conical prism of the compound double-faced conical optical prism where it can be retained and selectively discharged as an multiplied amassed and concentrated intensified beam to a quadrivial prism by which it is split into individual beams and directed to a serial group of 100% reflective single-faced optical prisms disposed in their paths whereby to introduce said split beams back to the compound double-faced conical optical prism in a multiple recycling path repeatably through said compound double-faced conical optical prism, each recycled pass causing the beam to wrap around itself increasing the intensity of said input beam geometrically, said intensified beam capable of being retained within said conical double-faced conical prism, said retained intensified light beam being discharged rapidly by a 100% right-angle isosceles optical discharge prism intercepting the exit path of said intensified light beam.

Additionally, the compound double-faced conical optical prism can be formed as a single unitary optical prism. Alternatively, the system according to the invention can comprise an arrangement of a dual compound double-faced conical optical prism array including a pair of offset, partially superposed pair of compound double-faced conical optical prisms arranged one partially over the other with their axes offset one relative the other.

The invention also contemplates the combination of the conical double-faced prisms into a single body optical prism formed of optical glass and including all the necessary reflective surfaces of the right-angle isosceles prisms as a part thereof.

It is important that the incident light beam be parallel, that is, perpendicular to the entry face of the compound double-faced conical optical prisms. The output intensified emergent beam must exit in a path parallel to the incident beam and is further intensified with each pass through said compound double-faced conical prisms.

SUMMARY OF THE INVENTION

The invention provides an optical system for radiation amassment derived through intensification by cyclical accretion of energy radiation by passing a ninety degree parallel incident light energy beam perpendicular to a compound double-faced conical optical glass prism repetitively cyclically via plural single-faced 100% reflective right-angle isosceles optical prisms arranged in an endless recycled return path to and through said compound double-faced conical optical prism and plural single-faced 100% reflective right-angle isosceles optical prisms. The energy is amassed and concentrated during the continuous passage of the recycled light beam through the optical system and retained within said compound double-faced conical optical prism upon each pass through said system. A right-angle single-faced reflective isosceles optical glass prism can be inserted into the output (the emergent) intensified energy beam upon its exit from the compound double-faced conical optical energy beam to discharge the amassed energy rapidly to a selected receiving means offset from the optical system. The discharge prism can be inserted between any of the prismatic faces except for the conical prism where the energy beam is not parallel.

DESCRIPTION OF PREFERRED EMBODIMENTS

The invention provides an optical system that captures, concentrates and retains a charge of radiation, here light energy, from the source of a parallel energy beam such as a laser, sunlight, etc. which can be retained and discharged in a rapid manner.

The applicant has utilized the behavior of rays of light incident entering normally on one of two perpendicular faces of an optical glass prism whose principal section is an isosceles right-triangle. The rays of light enter the optical glass prism without deviation and strike the hypotenuse face at an angle of 45 degrees, which is greater than the critical angle of glass, they will be totally reflected there and turned through a right angle so that they will emerge in a direction normal to the other of the two perpendicular faces of the prism. None of the light is lost by total reflection in the prism, particularly if the prism is made of good optical glass of high transparency. Then there is little loss of light by absorption in the prism or by reflection upon entering or leaving the prism. While the same optical effect can be produced by a simple plane mirror, a polished metallic surface, such as provided by a plane mirror, has been found to absorb the incident light to a considerable extent.

Applicant has discovered that a light beam, can be intensified by passing a parallel incident light beam perpendicularly through a 100% reflective compound double-faced conical optical glass prism so that the beam is reflected serially at an angle of 45 degrees from one reflective face to the other reflective face also at 45 degrees. The light beam then is reflected at 45 degrees from said other face of the compound double-faced conical optical glass prism directing the concentrated and amassed light beam in a direction parallel to the incident light beam to exit the compound double-faced conical optical glass prism as an amassed and concentrated emergent light beam. The emergent amassed and concentrated light beam is recycled toward the 100% reflective compound double-faced conical optical glass prism along a return path through a series of 100% reflective single-faced right-angle isosceles prisms returning to and through the 100% reflective compound double-faced conical optical glass prism in one or more series of passes. Each pass results in the further amassment and concentration of the incident beam by causing said incident light beam serially to wrap around itself, increasing its intensity exponentially with each full recycled pass-through without loss of any light energy. In one embodiment of the invention, recycling is effected by directing the emergent amassed energy beam to a quadrivial optical glass prism, which is a pyramidial optical glass prism splitting the emergent amassed energy beam into four beams and directing the split beams toward the respective plural 100% reflective right-angle single faced isosceles optical glass prisms. In addition, applicant can effectively retain the accumulated amassed energy within the compound double-faced conical glass prism and discharge the accumulated energy rapidly, even in a singular burst, by intercepting the emergent beam with an 100% reflective right-angle single faced isosceles optical glass prism which can be described as a discharge prism.

The discharge prism can be inserted between any of the prismatic faces except for the faces of the compound double-faced conical optical glass prism. Use of a single compound double-faced conical double-faced conical glass prism will condense the incident beam forming an emergent beam only vertically while use of two compound double-faced prisms in series, as will be hereinafter described, will produce an emergent beam condensed horizontally as well as vertically. Both concentration and amassment can be produced with the optical system of the invention.

Figure 1:
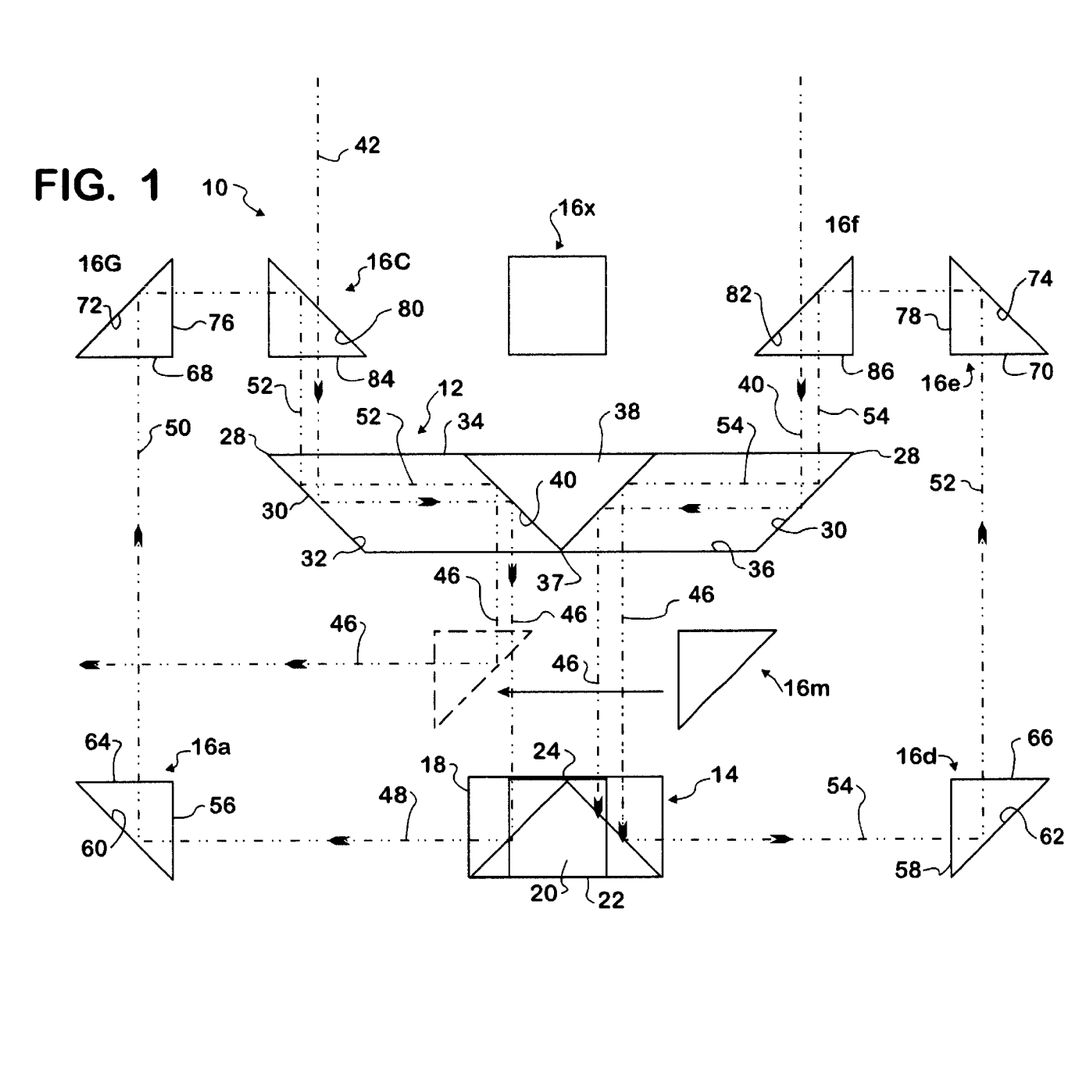
FIG. 1 is a diagrammatic flow representation of the optical system according to the invention.

Referring to FIG. 1 the optical radiation amassment system according to the invention is represented in diagrammatic flow representation, said system being generally indicated by reference character 10 and comprises a total of fifteen 100% reflective single faced isosceles (right-angle) glass optical prisms, at least one compound 100% reflective double-faced conical optical glass prism 12, one quadrivial optical glass prism 14 and plural single-faced 100% reflective isosceles glass optical prisms (16a, 16b, 16c, 16d, 16e, 16f, 16g, 16h, 16i, 16j, 16k 16l and 16m), prisms 16g, 16h, 16i, 16j, 16l and 16m are not each visible but are represented by box 16x as those prisms located along a path linearly rotated 90 degrees from the linear path within which the prisms 16a–16f are disposed. The quadrivial prism 14 is a single solid rectangular optical glass body 18 including a four-sided optical glass pyramid 20 encapsulated within said rectangular body 18, said optical glass pyramid 18 having a base 22, an apex 24 and four right-angle 100% reflective faces 26a, 26b, 26c and 26d. (26b and 26c not visible in FIG. 1).

The compound 100% reflective double-faced conical glass prism 12 consists of an outer continuous circular ring 28 as a circular outer wall 30. The circular outer wall 30 has a 100% reflective inner face 32. The compound 100% double-faced optical glass prism has a top surface 34, a base surface 36 parallel to said top surface 34 and a central conical recess 38 opening to said top surface 34 and having a 100% conical reflective face 38 and a bottom apex 37 touching the base surface 36. Both the inner reflective face 32 and the conical reflective face 40 have a curvature of different radii sharing the same center formed to an exact tolerance.

As illustrated in FIG. 1, the incident light beam 42 is directed to the compound 100% reflective double-faced conical optical glass prism 12 from an overhead light source 44. The incident light beam 42 enters the top surface 34 oriented perpendicular thereto and impacts the 100% reflective inner face 32 of the circular outer wall 30 at an angle of 45 degrees relative thereto and is reflected therefrom at a 45 degree angle toward the central conical recess 38 and the 100% reflective face 40 thereof The light beam 42 impacts the circular reflective face 40 of the central conical recess 38 also at a 45 degree angle and is reflected therefrom at a 45 degree angle, directing the light energy beam 42 in a direction perpendicular toward the base 36 of said compound double-faced conical optical glass prism 12 and exit from the compound double-faced conical glass prism 12 as an emergent light beam 46 directed parallel to the incident light beam 42, each pass from one internal 100% reflective prism face to the other internal reflective face thereof effecting a three fold concentration increase.

The distance between the 100% reflective face 32 and the 100% reflective face 40 the conical recess 38 is selected to be three (3) inches (7.62 cms ). The incident light energy beam 42 can be in the form of sunlight or any other source of radiant energy, lasers, etc. In another example, if the outer diameter of the compound double-faced conical prism is four (4) inches (10.2 cms) and the diameter of the central conical formation at its base is two (2) inches (5.1 cms), the light energy beam traveling through will be concentrated exactly three (3) times, per each pass . . . that is, three squared (3×3)=9, 9×3=27, 27×3 or 81, etc . . . increased expotentially.

Upon its exit from the compound double-faced 100% reflective conical optical glass prism 12, the concentrated and/or amassed emergent light beam 46 is directed to the quadrivial prism 14 where it is divided into four split beams, two split beams 48, 50 being directed respectively along paths 52,54 leading to the single-faced 100% reflective right-angle isosceles optical prisms 16a and 16d. The other two split beams (not shown but being directed to the paths (not shown) leading to the 100% reflective right-angle isosceles optical prisms 16g, 16h, 16i, 16j, 16k, 16l (also not shown but represented as being within box 16x.) The paths leading to said 100% reflective single-faced right-angle isosceles optical glass prisms being "rotated" 90 degrees from the paths of the optical prisms 16a–16f The path taken by the split energy beams 48, 50 in their return to and through and return in the system 10 is represented, in FIG. 1, by the broken lines with the arrows absent. Generally, the return paths normally retrace the paths taken by the incident light beam 42 through the respective 100% reflective single-faced right-angle isosceles optical glass prisms 16a–16f.

Each of the single-faced right-angle isosceles optical glass prisms 16a–16l are provided with their single 100% reflective surfaces 16a–16l' along their hypotenuse. The 100% single-faced right-angle isosceles optical glass prisms 16a–16l are arranged spaced at 45 degrees about the compound double-faced conical optical glass prism 12, the group thereof in two rows, one row diametrically opposite the other row, said one row being illustrated in FIG. 1 while, as mentioned above, the other row is represented as disposed in square box 16x shown in said FIG. 1.

Upon exiting from the compound double-faced conical optical glass prism 12, the amassed and/or concentrated emergent energy beam 46 impacts upon the reflective faces 14a and 14b thereof and is split into four (4) split light beams, two of which, 48 and 50, are reflected at 45 degree angles in opposite directions toward the 100% reflective single-faced right-angle optical glass prisms which are represented as located in the box 16x.

The split light beams 48, 50 enter the vertical faces 56, 58 of the single-reflective faced isosceles prisms 16a and 16d respectively, and pass through said prisms 16a and 16d to engage the 100% reflective hypotenuse faces 60,62 of said respective 100% reflective single-faced isosceles prisms 16a and 16d and are reflected toward the horizontal faces 64,66 of 100% single-faced right-angle isosceles prisms 16*b* and 16*e* respectively, entering same through the horizontal faces 68,70 thereof, passing through to hit the 100% reflective hypotenuse faces 72,74 of said 100% reflective single-faced right-angle optical glass prisms 16*b* and 16*e* and are reflected at 45 degree angles therefrom, and are directed through the vertical faces 76,78 of said 100% reflective single-faced right-angle optical glass prisms 16*b* and 16*e*, entering said 100% reflective right-angle isosceles prisms 16*c* through the respective vertical faces thereof and impact respectively on the 100% reflective hypotenuse faces 80, 82 of said prisms 16*c* and 16*f* from which they are reflected at an angle of 45 degrees respectively toward the horizontal faces 84,86 of said 100% reflective single-faced right- angle optical glass prisms 16*c* and 16*f* through which they pass and return to the respective top surface 34 of said compound double faced conical optical glass prism 12 again to enter same in a direction perpendicular to the top surface 34 thereof and begin the return pass, following the return paths 50,52 to and through the compound 100% reflective compound double-faced conical optical glass prism 12 reflected from the 100% reflective face 32 of inner wall 30 to the 100% reflective face 40 of the central conical recess 38 to be reflected therefrom so as to exit from the circular base 36 thereof as an additionally concentrated and amassed (thereby intensified) emergent light beam 46. The resulting additionally concentrated and amassed (thereby intensified) emergent light beam exits to enter the quadrivial prism 14 and,again, follows the return path to and through the 100% single-faced right-angle isosceles prisms 16*a*–16*c* and 16*e*–16*f* returning to and through the 100% reflective compound double-faced conical optical glass prism 12, exiting now as a further additionally concentrated and amassed (thereby intensified) emergent light beam 46. However, the 100% reflective single-faced right-angle optical glass prism 16*m*, initially offset from the paths 52,54 now functioning as a discharge prism, is mechanically inserted in the paths 52,54, intercepting the further additionally concentrated and amassed (intensified) emergent fight beam 46 and directing same in a direction normal to paths 52,54, effecting the discharge of the said further additionally concentrated and amassed (intensified) light energy which had been accumulated within the system 10. The degree of the discharge is dependent upon the manipulation of the 100% reflective single-faced right-angle isosceles optical glass prism 16*m* (the discharge prism). One can describe the relationship of the respective emergent forms of the amassed and concentrated light beams in their passage as being "wrapped serially within themselves and sharing a mutual core", the cylindrical beam becoming in stages, succeeding successive oval beams effecting the formation of a linear beam with each pass, resulting in a line, as shown diagrammatically in FIG. 6A.

Figure 2:
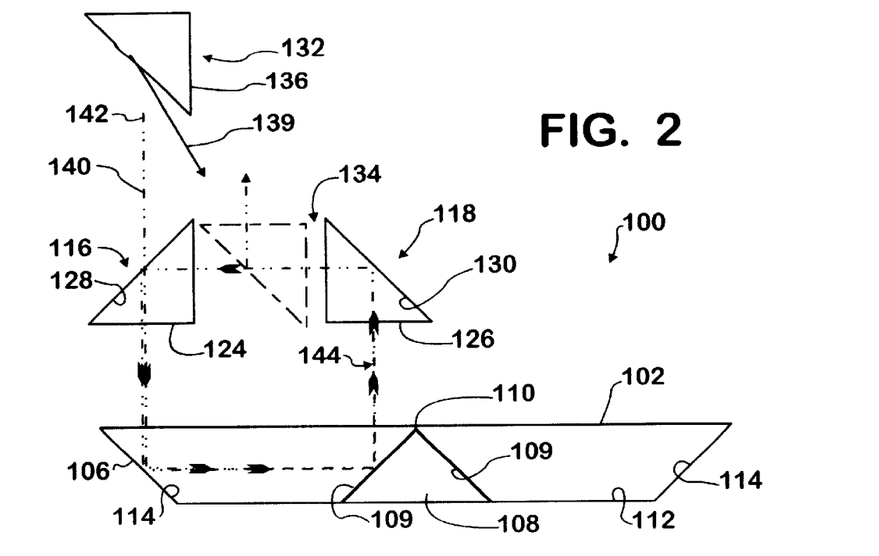
FIG. 2 is a simplified diagrammatic flow representation of a modified optical system according to the invention shown partially in perspective.

Referring now to FIG. 2, a relatively simplified optical system according to the invention also is illustrated in diagrammatic flow representation and designated generally by reference character 100. The system 100 comprises a 100% reflective compound double-faced conical optical glass prism 102 formed of a circular, dish-shaped configuration having a planar top surface 104, a circular outer wall 106, a central conical recess 108, the apex 110 of which touches the top surface 104, and a circular base 112 of lesser diameter than the circular outer wall 106 and parallel to said top surface 104. The circular outer wall 106 has an inner 100% reflective inner face 114. The central conical recess 108 has a 100% reflective face 109.

A pair of 100% reflective single-faced right-angle isosceles optical glass prisms 116,118 are positioned spaced apart with their vertical faces 120, 122 respectively equal in height and parallel. The horizontal faces 124,126 of said 100% reflective single-faced right-angle isosceles optical glass prisms 116 and 118 are coplanar. The hypotenuse faces 128,130 of said 100% reflective single-faced right-angle isosceles optical glass prisms 116,118 are 100% reflective. The pair of 100% reflective single-faced right-angle optical glass prisms 116,118 are located above the compound double-faced 100% reflective conical prism 102. An additional 100% reflective single-faced, right-angle isosceles optical glass prism 132 is arranged above the pair of 100% reflective single-faced right-angle isosceles prisms 116,118. The pair of 100 reflective single-faced right-angle optical glass isosceles prisms 116,118 are spaced apart to define a gap 134 between the vertical faces 122,124 thereof The additional 100% reflective single-faced right-angle optical glass isosceles prism 132 is mounted mechanically linked (as represented) so that it can be mechanically shifted to a position fully between the vertical faces 120,122 of the 100% reflective single-faced right-angle optical glass isosceles prisms 116,118 sufficiently to permit the additional 100% reflective single-faced right-angle reflective isosceles optical glass prism 132 to be introduced easily between the pair of 100% single-faced isosceles optical glass prisms 116,118 so as fully to fill the gap 134 between the said pair of 100% reflective single-faced right-angle optical glass isosceles prisms 116,118 when said 100% reflective single-faced right-angle optical glass prism 132 is mechanically shifted via link 140. The horizontal faces 128,130 of the pair of 100 % reflective single-faced right-angle isosceles optical glass prisms 116,118 being coplanar, together bridge the horizontal distance between the apex 112 of the central coaxial conical formation 110 and the outer wall 108 of the compound double-faced conical prism 102.

The additional 100% single-faced right-angle optical glass prism 132 is identical in configuration with the configuration of the 100% reflective single-faced right-angle isosceles 116, 118 except that it is inverted, that is, the vertical face 136 of said additional single-faced right-angle isosceles optical glass prism 132, when inserted between the pair of 100% reflective single-faced right-angle isosceles optical glass prisms, 116,118 is parallel to the vertical faces 120, 122 of said prisms 116 and 118. The 100% reflective single-faced right-angle isosceles optical glass prism 132 is mounted for selective mechanical movement via link 139 to a position (shown in broken line representation in FIG. 3) between the pair of 100% reflective single-faced right-angle isosceles optical glass prisms 116,118, the said prism 132 entering the gap 134 between said 100% reflective single-faced right-angle isosceles prisms 116, 118.

In FIG. 2, a vertically directed incident light beam 140 travels along the path represented by the broken line (with arrows) from a light source 142 located above the 100% reflective compound double-faced conical optical glass prism 102. The incident light beam 140 enters the top surface 104 of the compound double-faced conical optical glass prism in a direction perpendicular to the top surface 104 thereof and strikes the inner reflective face 114 of the outer wall 106 of said compound 100% reflective double-faced conical optical glass prism 102 at a 45 degree angle relative to said reflective face 114 and is reflected in a 45 degree direction relative said reflective face 114 direction inward to the 100% reflective surface 109 of the central conical recess while being amassed and concentrated further by a power of three. The light beam 140 hits the reflective face 109 then is reflected upward at a 45 degree angle relative from said reflective face 109 to enter into the 100% reflective single-faced right-angle isosceles prism 118 through the horizontal surface 126 thereof to strike the reflective inner hypotenuse face 130 of the fight-angle isosceles prism 126. From the inner hypotenuse face 130 of the prism 118 the light beam 140 then passes through the vertical face 122 of the 100% reflective single-faced right-angle isosceles prism 118, passes across the gap 134 and enters the right-angle isosceles prism 116 through the vertical face 120 thereof and travels to the hypotenuse face 128 thereof from whence the light beam 140 is reflected at a 45 degree angle toward the horizontal face 120 of the 100% reflective single-faced right angle optical glass prism 118 to return to and enter the compound double-faced conical optical glass prism 102 perpendicular to and through the top surface 104 to impact upon the 100% reflective face 114, reflecting therefrom again to the 100% reflective single-faced right-angle isosceles optical glass prism 118. As the light beam 140, now as an amassed and concentrated light beam 144 approaches the vertical face 122 of the prism 118, and is about to enter the gap 134, the additional 100% reflective single-faced right-angle isosceles optical glass prism 132 is mechanically shifted into the gap 134 to intercept the amassed and concentrated light beam 144 and discharge the accumulated energy content of the amassed and concentrated (intensified) light beam 144 rapidly and/or depending upon the manipulation of said additional 100% reflective single-faced right-angle isosceles glass prism 132. The recycling of the incident (and the intensified) light beam can be continued repeatedly with continuing amassment and concentration (intensification) of the subject light beam with continued recycling passes through the system 100.

Figure 3:
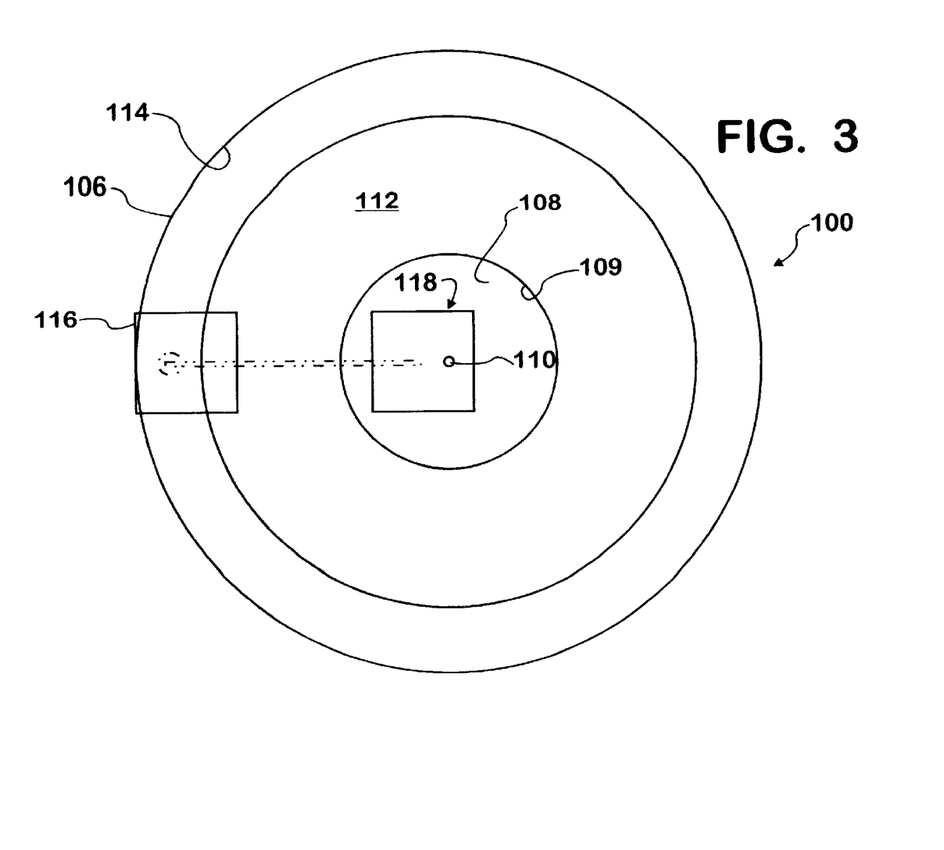
FIG. 3 is a top plan view of the representation of the modified optical system shown in plan view of the modified optical system shown in FIG. 2.

FIG. 3 illustrates in plan view, the compound double-faced conical prism 102 showing the reflective face 114 of the outer wall 106 thereof, with the central conical recess and the apex 112 thereof. The pair of 100% reflective single-faced right-angle isosceles prisms are shown with the light beam represented by reference character 140 and the cross-paths across the gap 134 between the pair of the 100% reflective single-faced right-angle isosceles prisms represented by reference character 134 and the pair of 100% 100% reflective single-faced right-angle prisms being represented by boxes 16x.

Figure 6A:
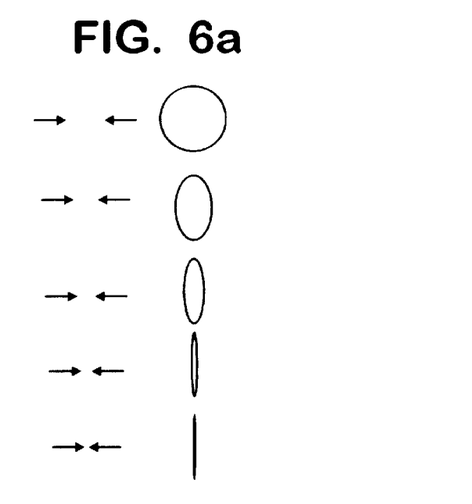
FIG. 6A is a chart illustrating the change in cross-section of the incident light energy beam as it is recycled through the optical system of FIG. 1; and,.

Referring to FIG. 6A, the systems 10 and 100 are capable of concentrating an incident "input" light beam only in a vertical direction, that is gradually reducing the diameter of the cylindrical input light beam in reduced stages, narrowing same from a first reduced oval gradually to form still narrower "compressed oval" to a single line since the beam passes through only a single compound double-faced conical optical glass prism.

Thus, the simplified optical system 100 according to the invention, involves a parallel light beam from a source thereof, permitted to enter the compound double-faced conical prism perpendicular to the top surface thereof. The said light beam strikes the inner reflective face and is reflected inward toward the center conical formation while being amassed and concentrated (intensified) by a power of three (3). The intensified light beam then is reflected upward into the first single-faced right-angle isosceles optical glass prism. The said first single-faced right-angle isosceles optical glass prism reflects the light beam upward into the second single-faced right-angle isosceles prism which reflects the beam across the gap. The size of the unit 100 varies in accordance with the diameter of the incident light beam. For example, the system 100 involves a one (1) inch (2.2 cm) diameter incident light beam.

Figure 4:
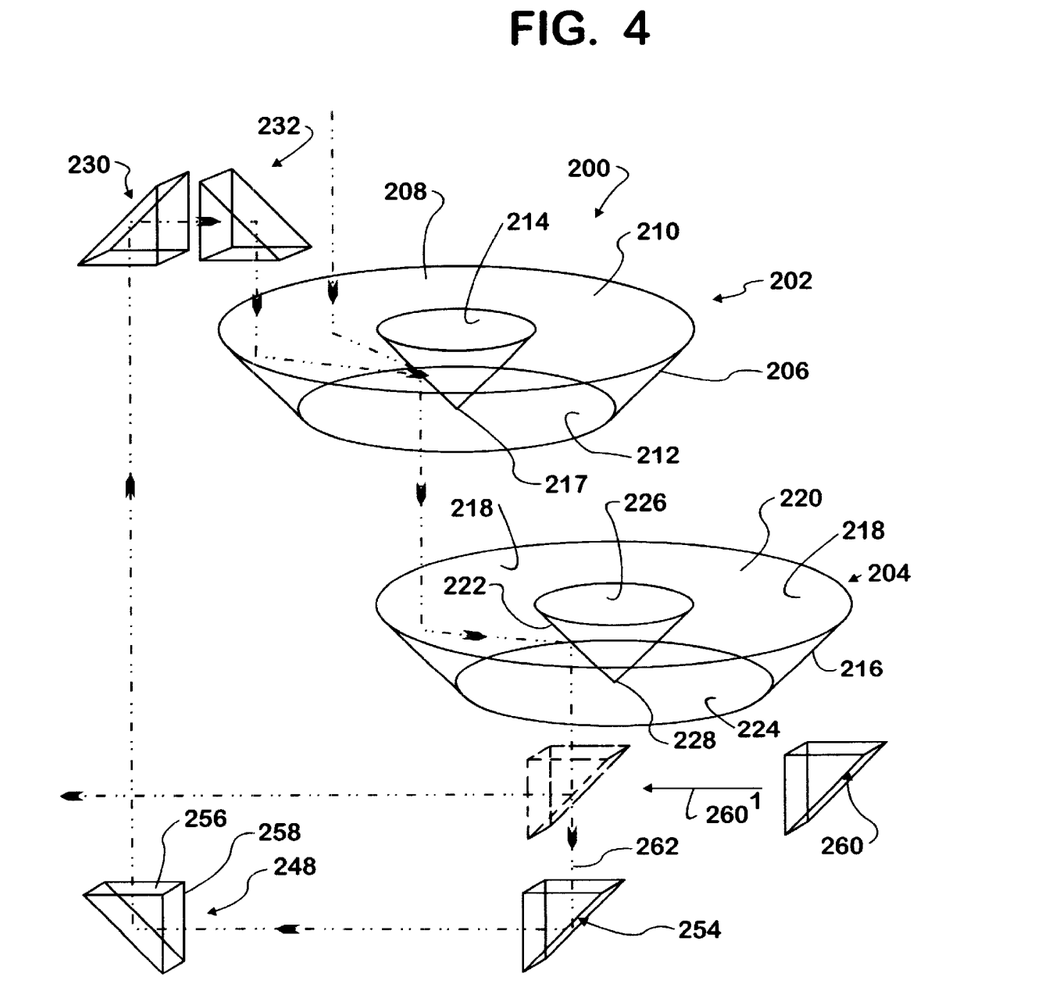
FIG. 4 is a diagrammatic flow representation of an additionally modified optical system according to the invention shown in perspective.

Directing attention to FIG. 4 in which a modified embodiment of the system according to the invention is illustrated and designated generally by reference character 200, said system being a dual system consisting of an array formed of a pair of compound double-faced 100% reflective conical optical prisms 202,204, each identical to the compound double-faced conical prism 102 of the system illustrated in FIG. 1. The dual array system 200 functions in much the same manner as the single array system. The advantage of the dual array system is that the incident energy beam is concentrated in both vertical and horizontal dimensions, while the systems 10 and 100 narrows the light beam only compressing horizontally.

Figure 6B:
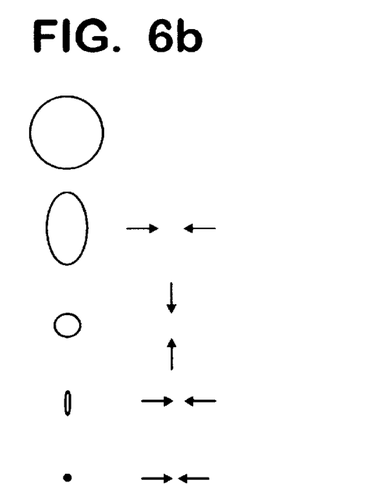
FIG. 6B is a chart illustrating the change in cross-section of the incident light energy beam as it is recycled through the optical system of FIG. 4.

Referring to FIG. 6B, the dual configured system 200 is capable of concentrating an incident "input" light beam both vertically and horizontally, the vertical concentration taking the form of an elongate line while the horizontal concentration effects a decrease in the diameter of the light beam with reduced length eventually to take the form of a dot or point. As represented in FIG. 6B, the first amassment of the cylindrical incident light beam to assume a first amassed emergent light beam results in a compression to an oval cross-section; next, the first amassed emergent light beam has been compressed vertically toward an ever smaller core to form a second resulting emergent amassed light beam which has assumed a reduced diameter cylindrical cross-section; the third pass through results in the second emergent amassed light beam being compressed horizontally to a further amassed emergent light beam formed into a reduced cylindrical cross-section configuration; the fourth pass through results in compression of the reduced cylindrical cross-section configuration to a still further narrowed oval cross-section, a practically linear configuration; and, after the next pass, the further amassed emergent light energy beam; and, a further pass provides a still further amassed emergent light beam having a configuration of a dot or point.

As shown in FIG. 4, the system 200 comprises a pair of compound double-faced conical optical glass prisms 202, 204 arranged with one compound double-faced conical optical glass prism 202 being vertically offset from and above the other compound double-faced optical glass prism 204. The compound double-faced optical glass prism 202 has a circular outer wall 206 with an inner 100% reflective face 208, a circular planar top surface 210, a circular base 212 having a diameter less than the diameter of the top surface 210 and a central conical recess 214 opening to the top surface 210 of the prism 202. The conical recess 214 has an apex 217 touching the base 212. The inner face 208 of outer wall 206 is 100% reflective. The compound double-faced conical optical glass prism 204 has a circular outer wall 216 with an inner reflective face 218, a circular planar top surface 220, a circular base 224 having a diameter less than the diameter of the top surface 220 and a central conical recess 226 opening to the top surface 220. The central conical recess has a 100% reflective surface and an apex 228 which is aligned with the peripheral edge of the base 212 of the compound double-faced optical glass prism 202.

A pair of 100% reflective single-faced right-angle isosceles optical glass prisms 230, 232 are arranged in proximity to the compound double-faced conical optical prism 202 with the vertical faces 234, 236 respectively, parallel and spaced one from the other to define a gap 238. The horizontal faces 240 and 242 of said prisms 230 and 232 respectively are coplanar. The pair of 100% reflective single-faced right-angle isosceles optical glass prisms 230,232 have 100% reflective hypotenuse faces 244 and 246, respectively. The 100% reflective single-faced right-angle isosceles optical glass prisms 230 and 232 are arranged with their 100% reflective hypotenuse faces 244 and 246 oriented in opposite directions, as shown in FIG. 4.

A third 100% reflective single-faced right-angle isosceles optical glass prism 248 is positioned spaced below the compound double-faced conical optical glass prism 204. The 100% reflective single-faced right-angle isosceles optical glass prism 248 has a horizontal face 250 and a vertical face 252. The horizontal face 250 of prism 248 is oriented facing and parallel to the circular base 224 of prism 204. A fourth 100% reflective single-faced right-angle isosceles optical glass prism 254 is positioned below the 100% reflective single-faced right-angle isosceles optical glass prism 230. The prism 254 has a horizontal face 256 and a vertical face 258 and is aligned with prisms 230 and 248 with the horizontal faces 250 and 256 respectively being parallel and the horizontal faces 250 and 256 also being parallel. The prism 254 is oriented so that the 100% hypotenuse reflective face of prism 254 faces upward toward the 100% reflective hypotenuse face 246 of the prism 230.

An additional 100% reflective single-faced right-angle isosceles optical glass prism 260 is positioned below the compound double-faced conical optical glass prism 204 and is horizontally offset from and above the 100% reflective single-faced right-angle optical glass prism 248 and is mechanically linked for positioning selectively to be translated in a direction horizontally below the compound double-faced conical prism 204, from its offset position from to a position above and aligned with the 100% reflective single-faced right-angle conical optical prism 254 and is arranged to be mechanically translated from its offset position shown in FIG. 4 (see arrow 254') by broken line, so as to intercept the emergent amassed light energy beam 262 which is directed in a vertical path to the horizontal face 250 effectively to cause the emergent amassed light beam 262 to be discharged rapidly.

Figure 5:
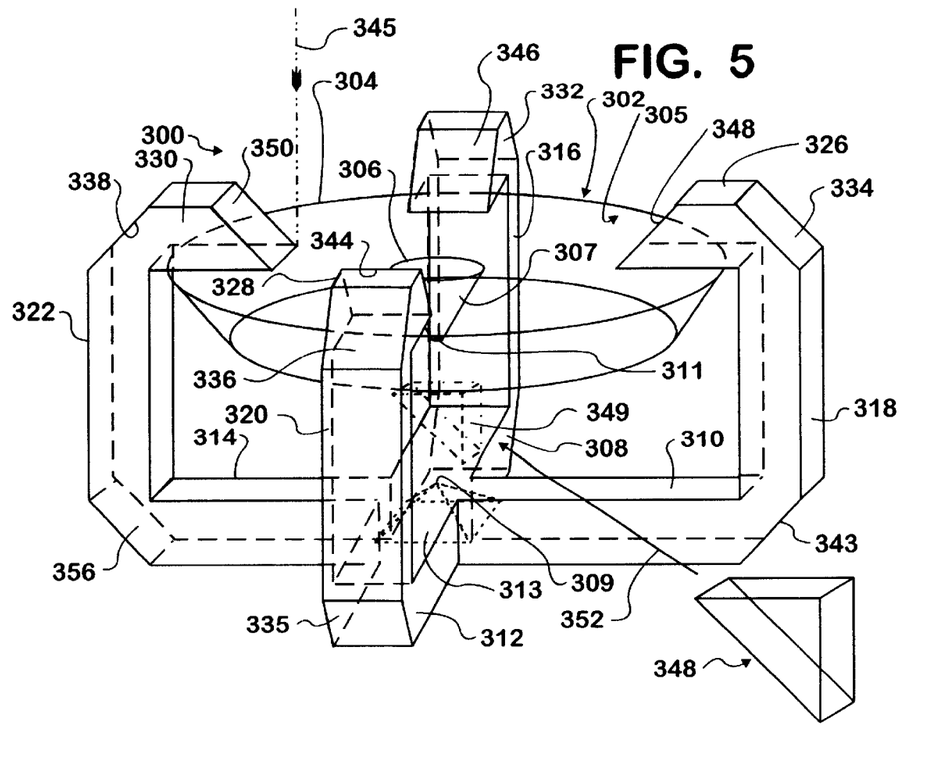
FIG. 5 is a perspective view of an additionally modified embodiment of the optical system according to the invention.

In FIG. 5, an additional embodiment of the radiation amassment and concentration optical system according to the invention is designated generally by reference character 300. The unitary 100% reflective compound double-faced conical optical glass prism 302 is formed as a unitized single unit with all the 100% reflective single-faced right-angle isosceles optical glass prisms being incorporated in the unitary single unit, eliminating all the separate individual prisms but the separate 100% reflective single-faced isosceles conical optical glass discharge prism.

The 100% reflective compound double-faced conical optical glass prism 302 is formed with an outer circular wall 304 and a central conical recess 306. The outer circular wall 304 has an inner 100% reflective face 305 while the central conical recess 306 carries a 100% reflective surface 307. The paths traversed by the incident energy beam being within the radial arms 308, 310, 312 and 314 unitary with the single unit. A four-sided pyramidal recess 313 is formed at the intersection of said arms 308, 310, 312 and 314 at a location with the apex 309 thereof aligned with the bottom apex 311 of the central conical recess 306 formed in the compound double-faced conical optical prism 302.

Each arm 308, 310, 312 and 314 has vertical legs, each formed of optical glass, 15 respectively, 316, 318, 320 and 322. The vertical legs each continue in return-bent arms 324, 326, 328 and 330, also formed of optical glass, each terminates in a 100% reflective hypotenuse angular face 332, 334, 336 and 338. At the return bend of each leg, a 100% reflective hypotenuse angular face 340, 342, 344 and 346, a 100% reflective hypotenuse face is provided.

An incident parallel light beam 345 from a light source 352 enters the top surface of the compound double-faced conical optical glass prism 302 and impacts upon the circular inner reflective face 305 of the outer wall 304 of the compound double-faced conical optical glass prism 302 and is reflected therefrom at a 45 degree angle toward the central conical recess 306 and hits the reflective face 307 of the central conical recess 306. The light beam 350 then passes through the circular base 342 to impact upon the reflective faces of the pyramidal recess 313 and are split into four beams which pass through the respective arms 308,310,312, 314, vertical legs 316,318,120,322, return-bent arms 324, 326,328,330 to reach the respective hypotenuse faces 332, 334,336, 338 through the terminal portions of said arms and are directed in return paths toward the reflective surfaces 305 and 307 following the return paths through the said arms and four-sided pyramid and through said arms, said hypotenuse faces 346, 348, 344, 350 in return paths back to the four-sided pyramid and including the arms, legs, return bent legs and terminal arms. A 100% reflective single-faced right-angle isosceles optical glass prism 348 is mounted outside the unitary glass prism 302 and is arranged for selective mechanical movement (see arrow 352 and broken line outline 349 of said prism 348) to enter between the conical recess 306 and the four-sided pyramidal recess 313 to intercept the emergent amassed concentrated light beams and discharge the amassed light energy thereof to a selected location.

The radiation amassment system according to the invention, in the rapid discharge mode, can be utilized for high-powered laser operations, while the metered discharge system can be employed in areas of industry, medicine and communications where vastly increased power can be of value.

Although the best modes contemplated for carrying out the present invention have been described, it will be apparent that modification and variation may be made without departing from the invention as defined in the appended claims.

I claim:

1. A radiation energy amassment optical device comprising at least one compound double-faced 100% reflective conical optical glass prism having a planar top surface, a circular outer wall, said outer wall having a 100% reflective concave inner surface, a central conical formation having an apex and a 100% reflective surface, plural 100% reflective single-faced right-angle isosceles optical glass prisms arranged serially in rows about said compound double-faced 100 reflective conical optical glass prism, said 100% reflective single-faced right angle isosceles optical glass prisms arranged to define a multiple repetitive path leading back to said compound double-faced 100% reflective conical optical glass prism, a parallel incident light beam from a source thereof, said parallel incident light beam arranged to enter said compound double-faced 100% reflective conical optical glass prism perpendicular to said top surface thereof and impact upon said inner 100% reflective concave surface of said outer wall at a 45 degree angle toward said 100% reflective surface of said central conical formation of said compound double-faced 100% reflective optical glass prism and being reflected therefrom at a 45 degree angle and exiting from said compound double-faced 100% reflective optical glass prism in a direction parallel to said incident light beam and leading and directing said exiting light beam in a return path via said rows of 100% reflective plural single-faced right-angle isosceles optical glass prisms at 45 degree angles in a return path leading back to said 100% reflective surfaces of said compound double-faced 100% reflective conical optical glass prism whereby repeatedly to return to and through said series of single-faced 100% reflective isosceles optical glass prisms and said compound double-faced 100% reflective optical glass prism surfaces along the same prior path and exiting from said compound double-faced 100% reflective conical glass prism as an emergent further amassed and concentrated light beam and an additional 100% reflective single-faced isosceles optical glass prism to discharge the energy of said further emergent amassed and concentrated light beam to a selected location.

2. A light beam amassment and concentrating optical glass device comprising a light source defining a parallel incident light beam, at least one compound double-faced 100% reflective conical optical glass prism having a circular outer wall, said circular outer wall having a 100% reflective concave inner surface, a planar top surface and an inner central conical formation having a 100% reflective face, said parallel incident light beam arranged to enter said compound double-faced 100% reflective conical optical glass prism perpendicular through the top surface thereof and be reflected from said 100% reflective inner surface thereof to said 100% reflective face of said inner central conical formation and be reflected from said 100% reflective face of said conical formation to exit said compound double-faced 100% reflective conical optical glass prism and plural 100% reflective single-faced right-angle 100% reflective isosceles optical glass prisms arranged to define a return path from the output of said compound double-faced 100% reflective conical optical glass prism to return to and pass through said compound double-faced 100% reflective conical optical glass prism and said 100% reflective surfaces and faces thereof serially and repeatably amassing and concentrating said reflected light beam with each pass through, said repeatably amassed and concentrated incident light beam exiting said compound double-faced 100% reflective conical optical glass prism as an emergent repeatedly amassed and concentrated incident light beam, and, an additional 100% reflective single-faced isosceles optical glass prism arranged to intercept said emergent repeatedly amassed and concentrated light beam to discharge the energy therefrom.

3. The light beam amassment optical device according to claim 1 and optical glass prism beam dividing means arranged to intercept said exiting further amassed light beam forming at least a pair of divided amassed light beams, said split beams entering said return path via said plural 100% reflective single-faced right angle isosceles optical glass prisms.

4. The light beam amassment optical device according to claim I and a second compound double-faced 100% reflective conical optical glass prism identical to said first compound double-faced 100% reflective conical optical glass prism and disposed in intercepting relationship with said first emergent amassed and concentrated beam, said intercepted emergent amassed and concentrated beam being redirected successively to said rows of plural 100% reflective single-faced isosceles glass prisms whereby to enter said first compound double-faced 100% reflective conical optical glass prism as a parallel beam entering perpendicular to the top surface thereof and being reflected from the concave reflective inner surface thereof at a 45 degree angle toward conical formation and being reflected therefrom at a 45 degree angle formation to be as an exiting parallel emergent further amassed and concentrated beam.

5. The light beam amassment optical device according to claim 1 in which said compound double-faced 100% reflective optical glass prism is formed as a unitary body of optical glass incorporating said plural 100% reflective single-faced right angle isosceles optical glass prisms and said additional 100% reflective single-faced right angle optical glass prism.

6. The light beam amassment optical device according to claim 1 and means dividing said emergent light beam into at least a pair of split light beams and directing said split light beams back to said compound double faced conical optical glass prism in a continuous cyclically repeated path thereto.

7. The light beam amassment optical device according to claim 6 in which said dividing means comprise a quadrivial 100% reflective optical glass body.

8. The light energy amassment and concentration optical system according to claim 1 in which a quadrival optical glass prism is disposed to receive said amassed and concentrated emergent light beam from said compound double-faced 100% reflective conical optical glass prism prior to reaching said plural 100% reflective single-faced right-angle isosceles optical glass prisms, said quadrival optical glass prism being capable of splitting said emergent light beam into four split light beams, each being capable of entering said plural 100% reflective single-faced right-angle isosceles optical glass prisms.

\* \* \* \* \*